(12) United States Patent
Blackwood et al.

(10) Patent No.: US 8,031,852 B2
(45) Date of Patent: Oct. 4, 2011

(54) METHOD FOR INCREASING EASE OF DOING BUSINESS THROUGH USE OF AN ACCESS POINT MODEL

(75) Inventors: Geraldine Blackwood, Mableton, GA (US); Walter Dobler, Ottenbach (CH); Jacqueline Lesley Ford, Southsea (GB); Dieter-Leonhard Mohr, Gaeufelden-Oschelbronn (DE); Nadina Rauf, Rome (IT); Richard J. Vazzana, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 11/114,762

(22) Filed: Apr. 26, 2005

(65) Prior Publication Data

US 2006/0239439 A1 Oct. 26, 2006

(51) Int. Cl.
*H04M 3/42* (2006.01)
(52) U.S. Cl. .................... 379/201.03; 379/88.18
(58) Field of Classification Search ...... 379/265.01–265.11, 266.09; 705/6–11; 370/352–356
See application file for complete search history.

(56) References Cited

U.S. PATENT DOCUMENTS

| | | | |
|---|---|---|---|
| 6,070,142 A | 5/2000 | McDonough et al. | |
| 6,338,081 B1 * | 1/2002 | Furusawa et al. | 709/202 |
| 6,700,971 B1 | 3/2004 | Cohen et al. | |
| 6,707,811 B2 * | 3/2004 | Greenberg et al. | 370/352 |
| 6,724,887 B1 | 4/2004 | Eilbacher et al. | |
| 6,760,727 B1 * | 7/2004 | Schroeder et al. | 707/10 |
| 6,766,011 B1 | 7/2004 | Fromm | |
| 7,039,166 B1 * | 5/2006 | Peterson et al. | 379/88.18 |
| 7,711,104 B1 * | 5/2010 | Flockhart et al. | 379/265.03 |
| 2002/0087385 A1 * | 7/2002 | Vincent | 705/10 |
| 2003/0154120 A1 * | 8/2003 | Freishtat et al. | 705/9 |
| 2004/0100493 A1 | 5/2004 | Reid et al. | |
| 2004/0120316 A1 * | 6/2004 | McCormack et al. | 370/392 |
| 2004/0120502 A1 * | 6/2004 | Strathmeyer et al. | 379/265.01 |
| 2005/0047579 A1 * | 3/2005 | Salame | 379/265.09 |
| 2005/0108140 A1 * | 5/2005 | Motte et al. | 705/37 |
| 2005/0125487 A1 * | 6/2005 | O'Connor et al. | 709/201 |
| 2006/0002540 A1 * | 1/2006 | Kreiner et al. | 379/265.02 |

OTHER PUBLICATIONS

Mitchell I., PSTN Access for Your Contact Center, Business Communications Review, vol. 33, No. 12, pp. 36-41, Dec. 2003.
Adam Hess and Kent E. Seamons, An Access Control Model for Dynamic Client-Side Content, Dept. of Computer Science, Brigham Young University, Jun. 2-3, 2003, pp. 207-216, Provo, Utah.

* cited by examiner

*Primary Examiner* — Fan Tsang
*Assistant Examiner* — Assad Mohammed
(74) *Attorney, Agent, or Firm* — Dillon & Yudell LLP

(57) ABSTRACT

A method and service for handling incoming customer calls. The invention uses an Access Point Model (APM) that includes an inventory of access entry points for voice, text, and/or web communication from a customer; a process network that lists the names and roles of customer contacts within the enterprise; an APM diagram of optimized pathways to be taken by particular incoming customer calls; rules for the customer contacts to follow when handling the incoming customer calls; and a synchronization of the customer calls with back-end processes within the enterprise that are responsive to instructions from the customer contacts.

20 Claims, 9 Drawing Sheets

Access Points Inventory

| Country 202 | Phone number 204 | Feedback Task Id 206 | Monitored by 208 | Request a Quote 210 | Order by e-mail 212 | Order by Fax 214 |
|---|---|---|---|---|---|---|
| name of country in scope | inbound number(s) for customers | give task id here | name of web team leader; team member(s) | email inbox address of web form | email inbox address for incoming web order | number for incoming fax |
| country 1 | | | | | | |
| country 2 | | | | | | |
| country 3 | | | | | | |
| country 4 | | | | | | |
| etc. | | | | | | |

Contact Center XYZ

Process Network

| Contact Center XYZ | Definition | Review | Approval | Implementation |
|---|---|---|---|---|
| Project ABC positions | Focal point names go here | | | |
| – Web Process Development Manager | x | | | |
| – Public Internet Commerce Site Deployment Manager | x | x | x | |
| – Technical lead, Public Internet Commerce Site | x | x | x | |
| – Web Strategy and Design Manager | x | | | |
| – Public Internet Commerce Site requirements | x | x | | |
| – Access Point Model (APM) Project Manager | x | x | | |
| – Web Process Development Leader | x | x | | |
| – Web Infrastructure Project Manager | x | | | |
| – Sales Execution and Web Projects | x | x | | x |
| – Helpdesk Process Coordinator | x | x | | x |
| – Web Development Project Leader | | | | |
| – Public Internet Sales | | | | |
| Contact Center XYZ positions | | | | |
| ■ Customer Helpdesk Manager | x | x | x | x |
| – Customer Helpdesk Team Leader | x | x | x | x |
| Brand Alpha positions | | | | |
| ■ Sales Program Manager | x | x | x | x |
| – Distribution Channel Management | x | x | x | x |
| – Product Manager | x | x | x | x |
| – Interactive Marketing Manager | x | x | x | x |

Telecoverage Access Point Model Description

500

- 1. Customer rings General Enquiry
  The customer may not know any contact numbers and therefore ring the switchboard or General Enquiry number according to the customer request. The Services center agent will transfer the call to the specific country telecoverage group or individual agent if the customer requests a rep by name
  - ◆ Telecoverage reps must never refuse a warm transfer call from the Services center
  - ◆ Service center agents will use the CRM tool to document and track Leads passed to Telecoverage. Also where the Services center agent is unable to directly warm transfer the call then the CRM tool may be used as the transfer medium.

- 2. Customer rings country general telecoverage number(s)
  - ◆ Option a) One non-geographic (toll share) general telecoverage number for entire country telecoverage group (suitable for smaller centers)
    - OR
  - ◆ Option b) One non-geographic (toll share) number for each major telecoverage group
    - Large accounts, Business Partners, Small/medium accounts
  - the number arrives in the local (country) telecoverage center
  - An announcement NOTE 1 gives the customer the option to
    - ◆ A. enter an agent extn (see 3)
    - ◆ B. If customer does not enter an agent extn the call will go to the first available agent in the Telecoverage group

- 3. Customer rings the agent directly using agent extn (see 2A)
  - ◆ if the agent is available the customer will be connected
    - OR
  - ◆ if the agent is not available then the customer will be proposed via IVR (Interactive Voice Response) to choose
    - to be transferred to another agent from the same group
      - the call will be routed to another agent with the same skill
      - if another agent with same skill not available the call will be routed to next available agent in the Telecoverage group
      - if no Telecoverage agent available an announcement advises the customer xxxxxx (local telephony announcement text)
    - OR,
    - to leave a message on the agent's voicemail   NOTE 2

Figure 5b

Telecoverage Access Point Model Description (cont.)

500

- 4. Customer wants to use Fax
  - ◆ there should be a fax number dedicated to Telecoverage
    - geographical or non-geographical toll-share (preferable)

- 5. Customer requests Call Me Back from an e-site
  - ◆ telecoverage agent calls customer back ASAP

- 6. An agent receives internal calls
  - ◆ the call will follow the scenario described on point 3

NOTE 1 - Example Generic Text of Announcement

"You have reached sales center xxxxx. Your call may be recorded for quality purposes. If you know the extension number of the party you are calling please enter this now. If not your call will be answered by the next available representative."

where xxxxx = country name

NOTE 2 - Agent Voicemail

Agent voicemail is to be recommended and used in the Telecoverage centers only (not Telesales or Service centers). Before VM is implemented, clear guidance must be documented for Voicemail messages, rules of use, backup & cover. Team Leaders are responsible for ensuring that the agents adhere to these guidelines.

Figure 6a

Rules of Engagement - Service Center agents

1. Warm transfer is <u>always</u> the preferred option (using Telecoverage country or Agent extension numbers)

2. When unable to warm transfer on the first occasion, advise the customer and offer to try again. Two attempts are the advised maximum 3. If you are unable to warm transfer after the second attempt (approx. 25 secs), then offer to give customer the telecoverage agent's direct number as the preferred option*

4. Service Center agents will use the CRM tool to raise a call back activity for Telecoverage Agents when call transfer not possible.

5. TaskIDs must be monitored regularly so as to ensure maximum possibility of achieving Service Level of 4 hour turnaround

<u>*Agent discretion to be applied in all cases based on customer preference</u>

Figure 6b

Rules of Engagement - Telecoverage Agents

1. There is no 'hard turnback' policy. All sales and marketing related calls must be accepted on warm transfer
2. Provide your full name including surname and confirm spelling of any unusual names
3. Advise the customer if you are scheduled to be out of the office for any period of time
4. Provide alternative back up name if you are likely to be absent during next scheduled call
5. Offer the customer the opportunity to contact you/Telecoverage directly using your Agent number for the next call
6. Include your own Agent number on all email/non verbal communications with customers
7. Telecoverage agents will accept warm transfer calls from Service Center agents. Once contact from Service Centre is received warm transfer must take place within 40 seconds service level
8. Team meetings : Telecoverage Team Leaders will provide Service Center country/regional teams one working days notice of team meetings and gain approval for coverage during this period, following the existing Access Point Model transfer model. Exception : Special events and Disaster recovery
9. 'My Activities' queues (Sales lead activities assigned by Service Centers) must be monitored regularly so as to ensure maximum possibility of achieving Service Level of x hour turnaround

602

METHOD FOR INCREASING EASE OF DOING BUSINESS THROUGH USE OF AN ACCESS POINT MODEL

BACKGROUND OF THE INVENTION

1. Technical Field

The present invention relates in general to the field of handling customer calls. In particular, the present invention relates to a method and service for directing a customer call to an appropriate attendant by streamlining integration of customer contact mechanisms and clearly defining the roles, responsibilities and relationships between internal organizations of the enterprise to which the customer call is directed.

2. Description of the Related Art

A major source of customer dissatisfaction with an enterprise is excessive phone transfers. That is, when a customer calls the enterprise's central number requesting advice, a specific product or service, or even a telephone number for a particular employee, her level of dissatisfaction increases 10-20% at each phone transfer. Thus, if a calling customer is transferred 3-4 times before reaching the needed person in the enterprise, the relationship between that customer and that needed person has already soured at the start of their telephone conversation.

The problem of knowing how to direct the customer's call is made more difficult if the enterprise has thousands of employees in the customer service/sales area, and the problem is exacerbated further if the employees are spread out across country borders. For example, an enterprise may have a central number in Europe, but the service/product needed may be in a particular country, such as Switzerland.

What is needed therefore is a method and system for efficiently directing a customer's call to an appropriate person who can provide the needed service, either within the enterprise or from a business partner of the enterprise.

SUMMARY OF THE INVENTION

The present invention is thus directed to a method and service for handling incoming customer calls and requests. The invention uses an Access Point Model (APM) that includes an inventory of access entry points for voice, text, and/or web communication from a customer; a process network that lists the names and roles of customer contacts within the enterprise; an APM diagram of optimized pathways to be taken by particular incoming customer calls; rules for the customer contacts to follow when handling the incoming customer calls; and a synchronization of the customer calls with back-end processes within the enterprise that are responsive to instructions from the customer contacts The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present invention defines and utilizes a set of processes which are defined herein as an Access Point Model (APM). APM is a set of processes which support the simplification of customer contact experience. This is accomplished through the streamlined integration of customer contact mechanisms and a clear definition of roles, responsibilities and relationships between internal enterprise organizations. APM reduces customer transfers, thus establishing the enterprise's ownership of business opportunities and increasing customer satisfaction.

APM identifies all access points of entry for a customer, both web and non-web, and provides a defined roadmap to the appropriate resource (either internal or partnered) with the skills required to resolve the customer's request within a defined timeframe. An access point is defined as any mechanism by which a customer can contact the enterprise (i.e., voice calls, web, text chat, call me buttons, etc.)

APM is a collaboration and representation of all front-end (customer facing) and back-end (internal facing) processes. APM begins operation when the customer requests entrance to the enterprise, and ends at a point where the customer's request reaches a appropriate resolution provider. Key customer facing roles involved in the execution of APM are as follows.

Services Center Agents are telephone and/or web based customer support representatives responsible for general inquiries and resolution or redirection of customer non-sales requests.

Telecoverage Representatives are telephone and/or web based customer relationship account managers responsible for building relationships and identifying opportunities.

Telesales are telephone and/or web based sales reps responsible for owning and closing opportunities.

Telemarketing is telephone and/or web based marketing/sales reps responsible for campaign support and opportunity qualification.

Field Sales Representatives are face-to-face sales reps normally responsible for strategic accounts and complex opportunities.

Business Partners are an enterprise's third party business partners and associates.

Figure 1:
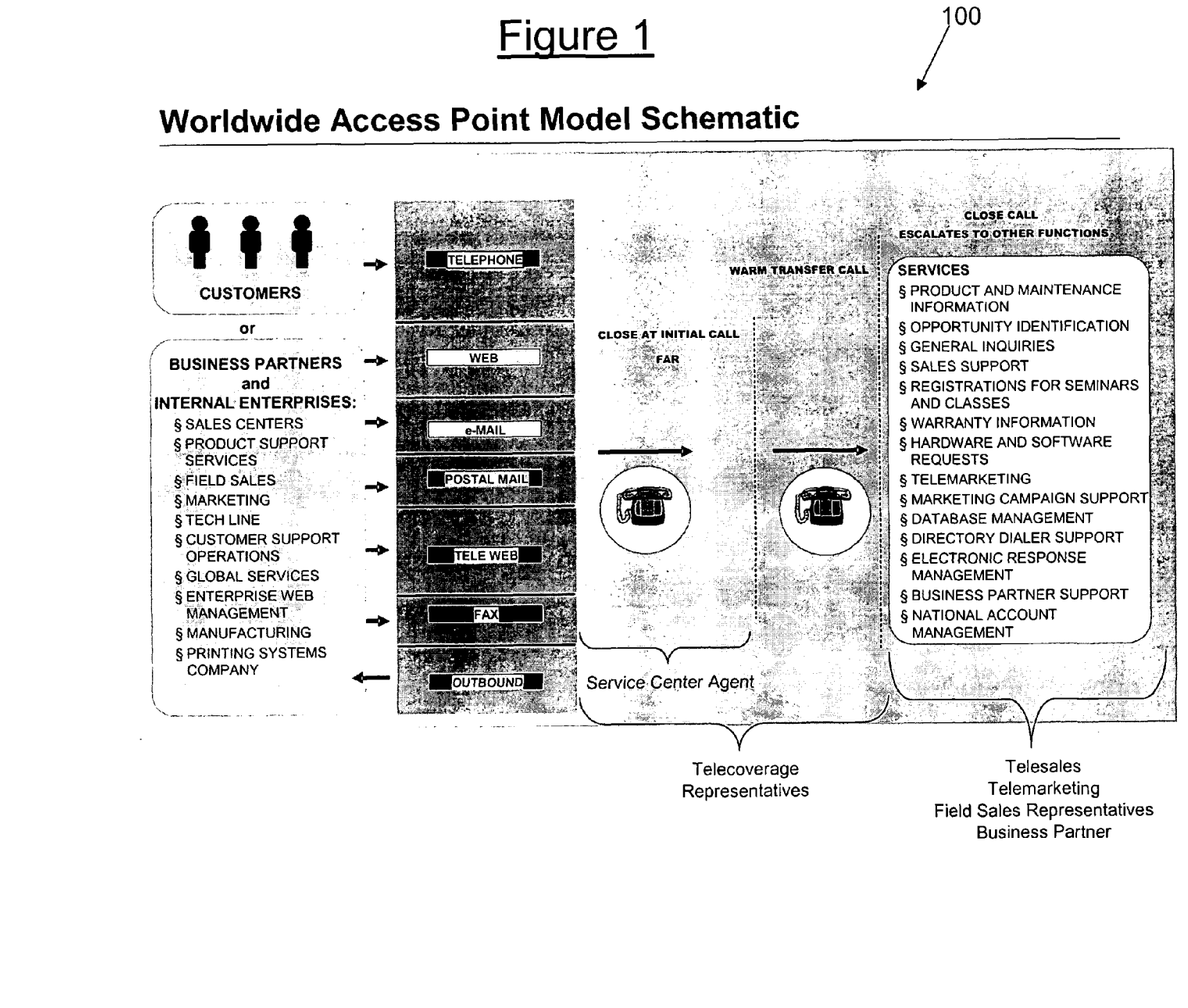
FIG. 1 depicts a Worldwide Access Point Model (APM) Schematic showing an optimum pathway for a call to be transferred from a customer to a person capable of providing a requested product or service.

With reference then to the figures, and particular to FIG. 1, a Worldwide Access Point Model (APM) schematic 100 is illustrated. As shown, APM directs calls, both from external customers as well as business partners and internal enterprises, which are received via a variety of media (e.g., telephone, web, e-mail, postal mail, tele-web such as web-capable cell phones or personal digital assistants, fax). The calls are sent to telecoverage representatives, either directly or through a service center agent. The telecoverage representatives establish the relationship with the customer and close the call, or they may escalate and direct the call to the appropriate resource (e.g., telesales, telemarketing, field sales representatives, business partner). Note that all calls are preferably passed on as a warm transfer call, in which the intermediary call handler (service center agent and/or telecoverage representative) establishes voice communication with the call receiver to ensure that the call receiver is available to the caller. Furthermore an existing customer will follow an established relationship path directly to their primary contact(s), thus avoiding the need for transfer or re-routing.

The main components of the APM process methodology are Access Points Inventory, a Process Network, an APM diagram, an APM description, Rules of Engagement/Document of Understanding, an Agent sign-off, a Synchronization with back-end processes, and a Management System.

Access Points Inventory

The Access Points Inventory identifies and documents all existing customer entry points for voice, e-mail, text chat, call me back buttons, fax, postal mail, etc. The Access Points inventory is analyzed for redundancies, deficiencies and overlaps and identifies streamlining and improvement opportunities targeting a reduced number of entry points. Each access point has a predetermined service level target which can be monitored and measured. For example, a Voice call may have a 25 second initial response target, which may be expanded up to a maximum of 40 seconds when including a warm transfer, while e-mail may have a 4 hour acknowledgement target, etc.

Figure 2:
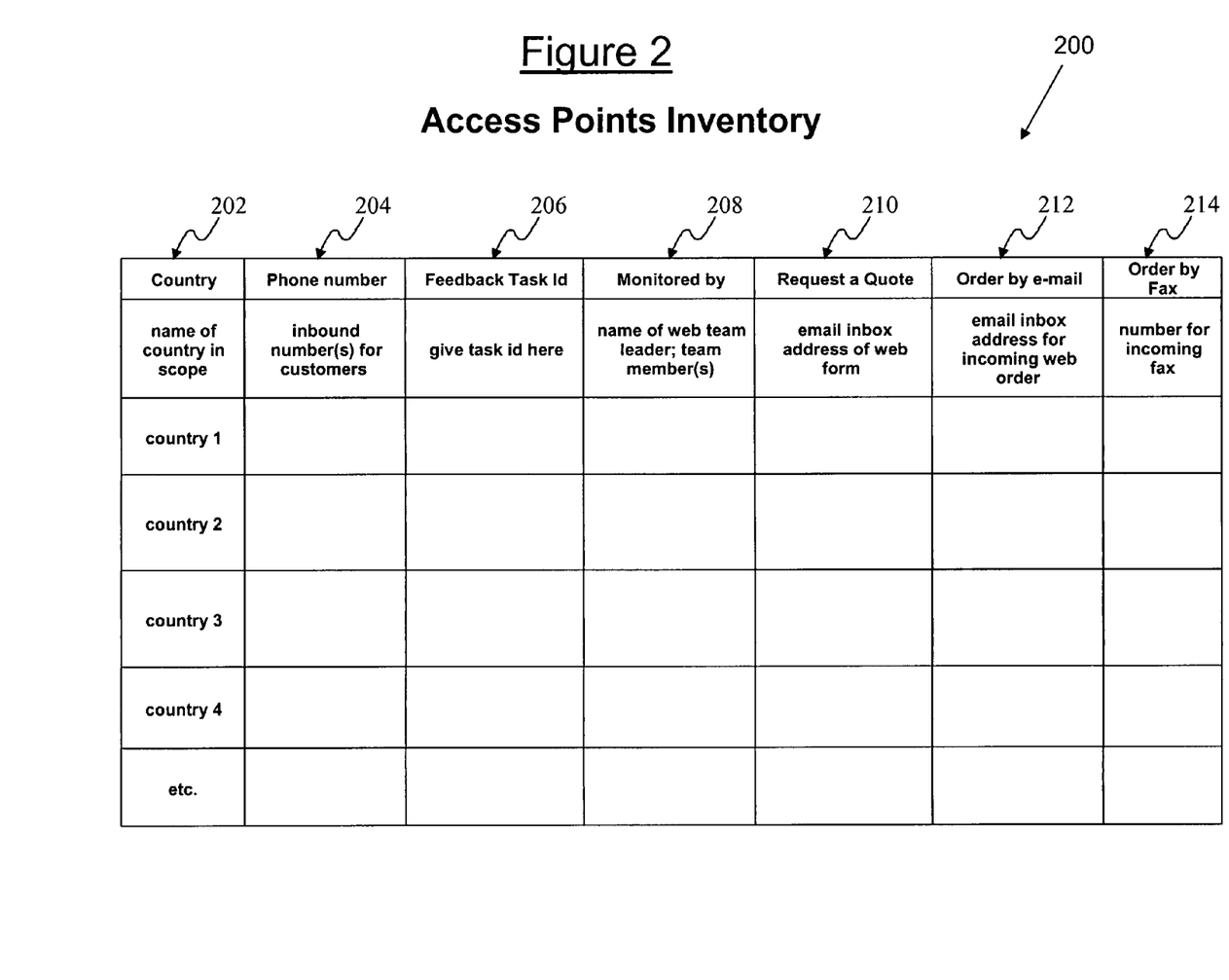
FIG. 2 illustrates an exemplary APM Access Point Inventory used to show access points for various countries serviced by the enterprise.

With reference now to FIG. 2, an exemplary Access Points Inventory 200 for callers who are calling from different countries is depicted. Access Points Inventory 200 includes multiple parameters, shown as parameters 202-214. Parameter 202 gives the name of the country in the scope of the call. That is, parameter 202 may be the location from which the call is originating, or it may be the country in which the service/product is needed.

Parameter 204 shows the number(s) that the caller uses. The number may be either a central number for a service center or a number to be called for a particular service/product. Preferably, parameter 204 describes whether each number is a toll number, a national call rate, etc.

Parameter 206 gives a feedback task id (form) on the web. Thus, the caller (or web user) can give the enterprise a feedback comment based on the caller's satisfaction with the call (or web) experience using the feedback task form on the web.

Parameter 208 gives the names of the manager and/or team members who take care of customers in a particular country and are responsible for execution of APM and the service level targets.

Parameter 210 shows the e-mail address to be monitored by the enterprise (preferably by the web team named in parameter 208) for customers who are requesting a quote for a particular product/service.

Parameter 212 shows the e-mail address to be monitored by the enterprise (preferably by the web team named in parameter 208) for customers who are ordering a particular product/service.

Parameter 214 shows the fax number to be monitored by the enterprise (preferably by the web team named in parameter 208) for customers who are ordering a particular product/service.

Process Network

Figure 3:
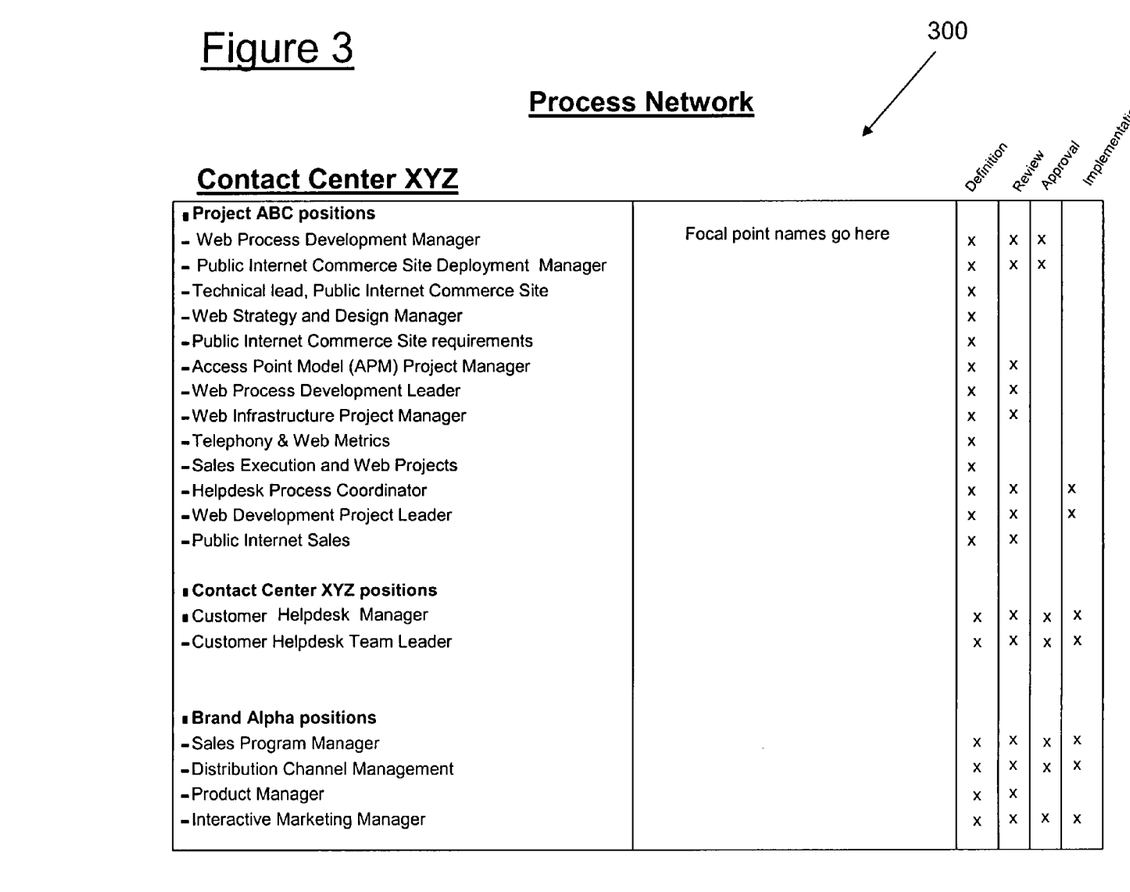
FIG. 3 depicts an exemplary APM Process Network showing the positions and responsibilities of persons who develop and implement the APM.

The Process Network lists all of the people responsible for the development, maintenance and execution of the Access Point Model for a particular project, program or initiative. The Process Network describes the roles and responsibilities of each person within a particular contact center. An exemplary Process Network 300 is shown in FIG. 3. For a particular contact center ("Contact Center XYZ"), the titles and names are shown for individuals filling positions for a particular project ("Project ABC"), service center ("Service Center XYZ"), and brand ("Brand Alpha") in Service Center XYZ. Note that Process Network 300 also identifies what authority/responsibility each title holds with regards to Project ABC. For example, the Web Process Development Manager has joint responsibility for the definition, review and approval of the Access Point Model, but does not do any of the actual implementation.

APM Diagram

Figure 4:
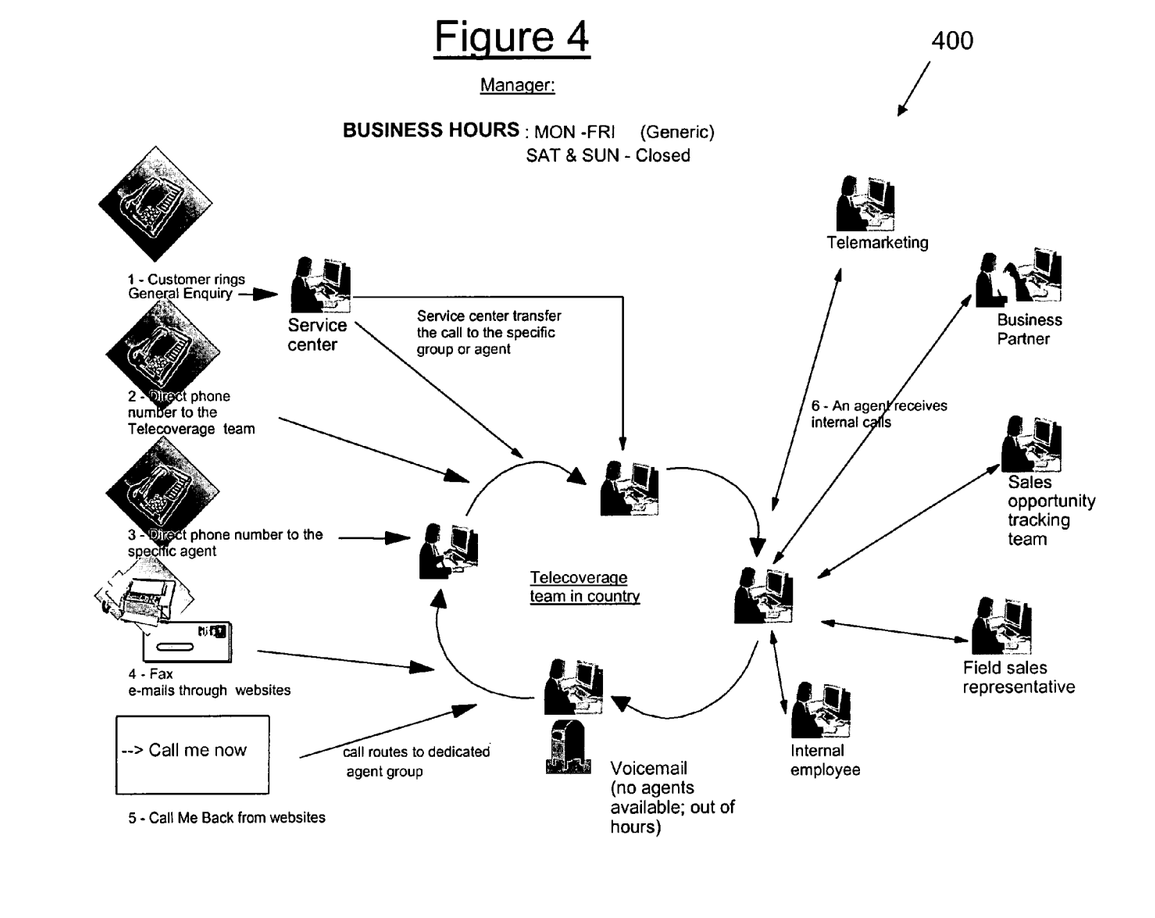
FIG. 4 is a high-level block diagram of the APM for a particular manager.

An Access Point Model (APM) diagram is a high level process document which illustrates the most optimized path a customer request, both web and non-web related, should follow to reach the appropriate enterprise resource to solve the customer's need within a documented timeframe. The APM diagram shows the customer at the left and the responsible specialist for closing the transaction on the right. With reference now to FIG. 4, an exemplary APM diagram 400 is depicted.

APM diagram 400 states operational hours and identifies and incorporates all existing customer entry points, including voice, e-mail, web interaction (live assistance, such as text chat, call me buttons, etc.), fax, and postal mail. A customer contacts, either directly or via the service center, an agent in a telecoverage team, such as a telecoverage team in a particular country. Each telecoverage agent, preferably a telecoverage representative described above, in the telecoverage team has expertise in the products and services available from enterprise internal departments (e.g., telemarketing, field sales representatives, support services, et al.) as well as with business partners that are outside of the enterprise. The telecoverage team agent is able to either handle the customer's request immediately, or the telecoverage team agent can get back to the customer after contacting one or the above described enterprise or non-enterprise entities. Preferably, the customer does not directly interface with more than one of the above described enterprise or non-enterprise entities, thus reducing the number of call transfers imposed on the customer.

Access Point Model (APM) Description

The Access Point Model (APM) Description is a narrative of each process step documented in the APM diagram 400. The narrative provides sufficient detail for a program owner to understand, implement, test and manage/monitor the customer handling process. The narrative preferably includes details of the type of access point, such as a telephone number (whether it is toll free, at a national call rate, etc.), announcement text (if there is an announcement greeting), Voice Response Unit (VRU)/Interactive Voice Response (IVR) options, information on routing of a task, etc. The narrative is also used to give contact center agents working instruction level detail to perform process steps.

Figure 5A:
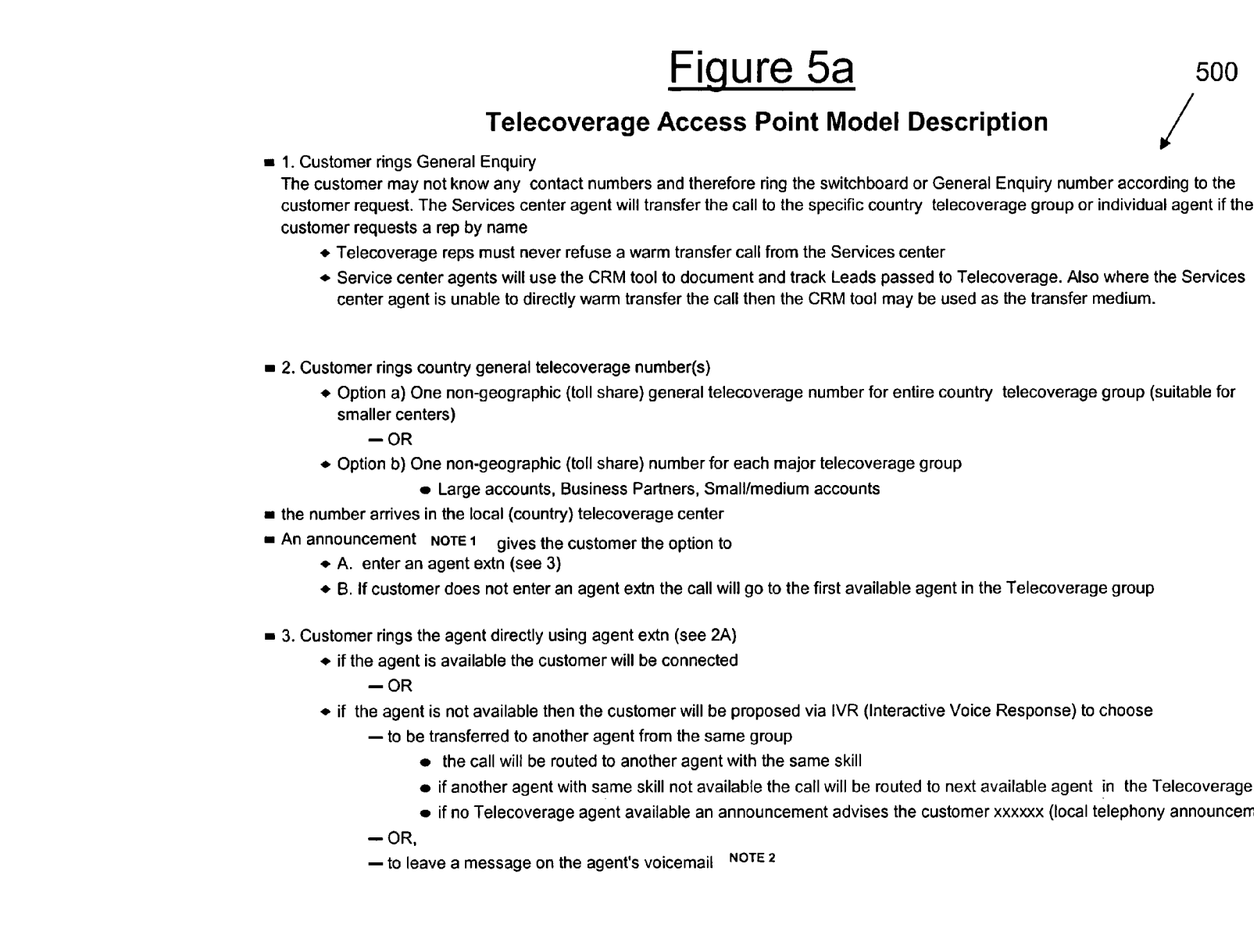
FIGS. 5a-b is a detailed description of steps taken in the APM block diagram shown in FIG. 4.
Figure 5B:
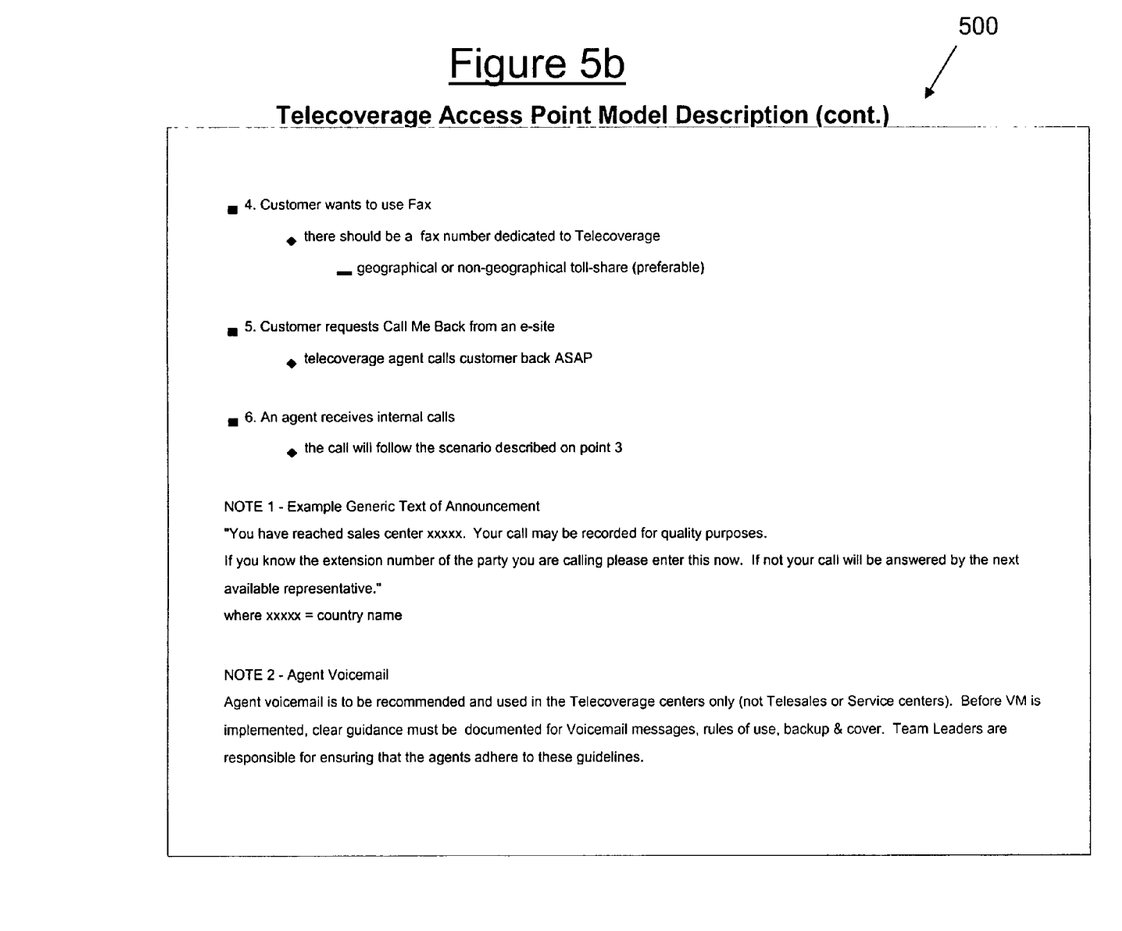

An exemplary APM Description 500 is shown in FIGS. 5a-b for APM diagram 400. In Step 1 (Customer rings General Enquiry) of APM diagram 400, the call goes to the Service Center if the customer does not have a contact name/number for the service/product needed. The Service Center transfers the call to a particular telecoverage team, such as one that is assigned for a specific country, or to a particular representative if so requested by the caller/customer. All calls are handed off from the Service Center to a person (not a recording) in the telecoverage team. The Service Center agent also enters each call into a Customer Relationship Management system for tracking the call and outcome of the call.

If the customer directly calls the telecoverage team in a country (Step 2 in APM diagram 400) or is sent to the telecoverage team by the service center (Step 1 in APM diagram 400 described above), the call may be sent to either the entire service center (preferable for small service centers) or to a subdivision of the service center (for a geographic subdivision of the country, for a group such as "large accounts," etc.). Each call should either go to the requested agent or to another equally qualified call handler in the telecoverage team.

If the customer directly calls a known contact (Step 3 in APM diagram 400), and the known contact is not available, then the caller/customer is given the option of going to the known contact's voice mail or being connected to another member of the telecoverage team.

Note that the call from a customer may be from a "call me now" button as described in Step 5 of APM diagram 400. This "call me now" button is a hot button on a Graphical User Interface (GUI) on a webpage supported by the telecoverage team. When the customer clicks the "call me now" button, an e-mail or similar message is sent to a dedicated agent in the telecoverage team (or alternatively to the service center) asking for a live phone call to be returned to the customer from an appropriate telecoverage team member.

Rules of Engagement/Document of Understanding

The Rules of Engagement give clear instructions to contact center agents regarding acceptable behavior when performing a hand-off of a customer call being transferred to another team or department. The Rules of Engagement apply to the agent performing the hand-off and to the agent accepting the call. Because of a decrease in customer satisfaction relative to an increase in the number of transfers that occur before the customer reaches his target, the Rules of Engagement are established to minimize customer dissatisfaction by executing a seamless transfer process that avoids placing customers on hold. The Rules of Engagement are also designed to minimize customer waiting times within an acceptable set of parameters defined by the prior customer feedback regarding what is an acceptable wait time.

Figure 6A:
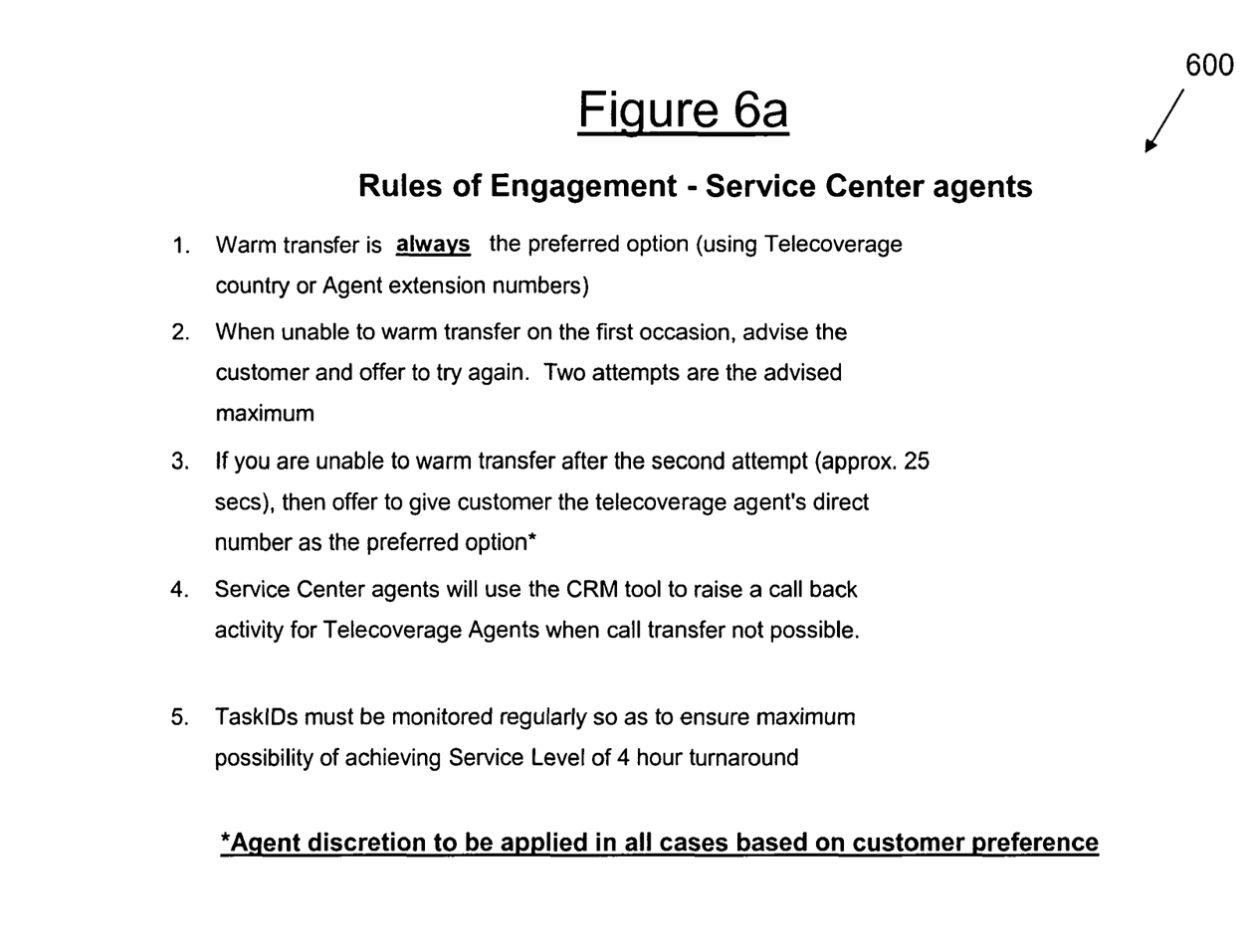
FIGS. 6a-b describe Rules of Engagement for Service Center Agents (Customer facing) and Telecoverage Agents (Customer and Enterprise facing)

With reference now to FIG. 6a, exemplary Rules of Engagement 600 for Service Center agents is provided. Note that the Rules of Engagement 600 for Service Center agents require warm transfers with a maximum of two subsequent attempts for a warm transfer is the primary agent is not available. Note also that TaskIDs are monitored regularly to ensure acceptable turnaround times.

Figure 6B:
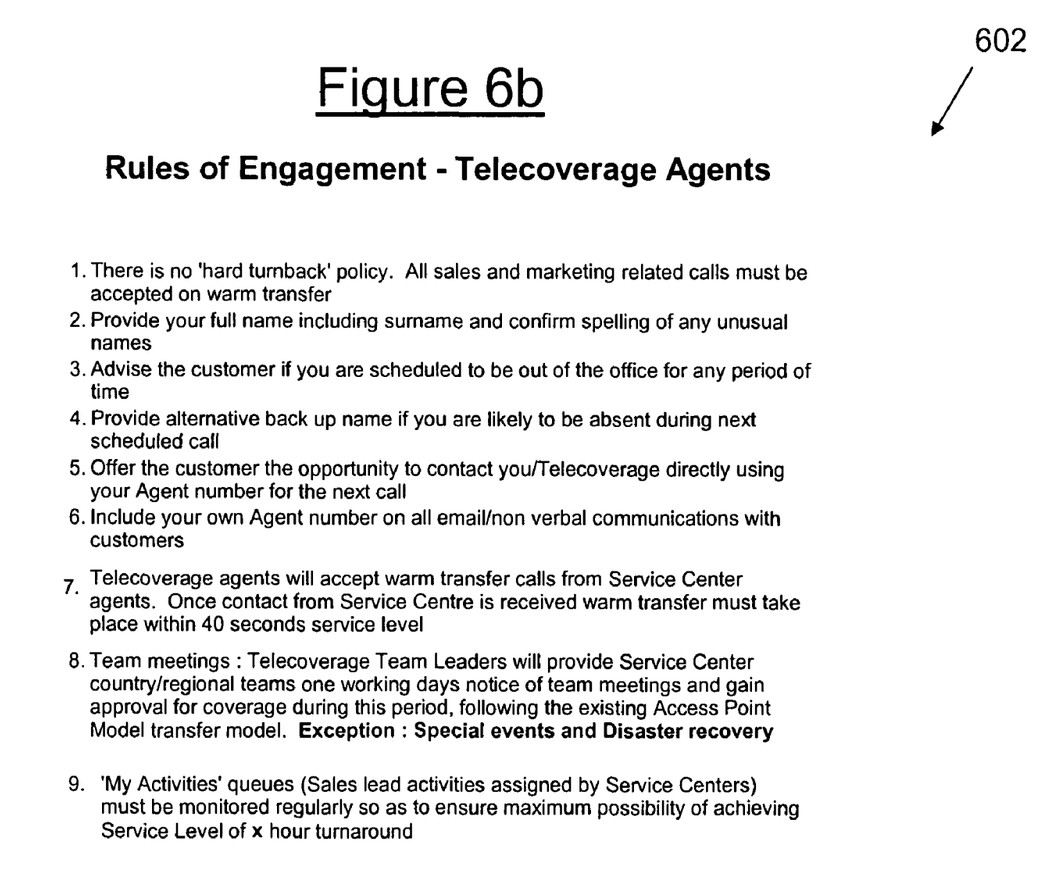

With reference to FIG. 6b, exemplary Rules of Engagement 602 for telecoverage agents who are receiving calls (either directly from the customer or from the Service Center agents) are shown. Note that the Rules of Engagement 602 include parameters for identifying both the caller as well as the telecoverage agent, as well as call follow-up procedures to ensure proper turnaround time.

Agent Sign-Off

The Agent sign-off process is a personal pledge by contact center agents (both service center and telecoverage team agents) that they have read, understood and will abide by the Rules of Engagement and execute the process steps in the APM. The agent sign-off signifies a personal commitment to execute the APM to a high standard, both when dealing with the customer (front-end) as well as other enterprise departments (back-end).

Synchronization with Back-End Processes

The back-end processes describe the steps, roles, responsibilities and tools necessary to manage customer requests (e.g., request for information, request for a quote, direct orders, other sales opportunities). The main process steps involved are:

Request reception, qualification and handling/routing;
Opportunity qualification and management;
Payment processing;
Linkage to the fulfillment processes (including return/refund)
Linkage to the measurement processes.

The synchronization with back-end processes is performed as a final step in the APM development to meet business control requirements to reconcile every customer request to a final status conclusion.

Figure 7:
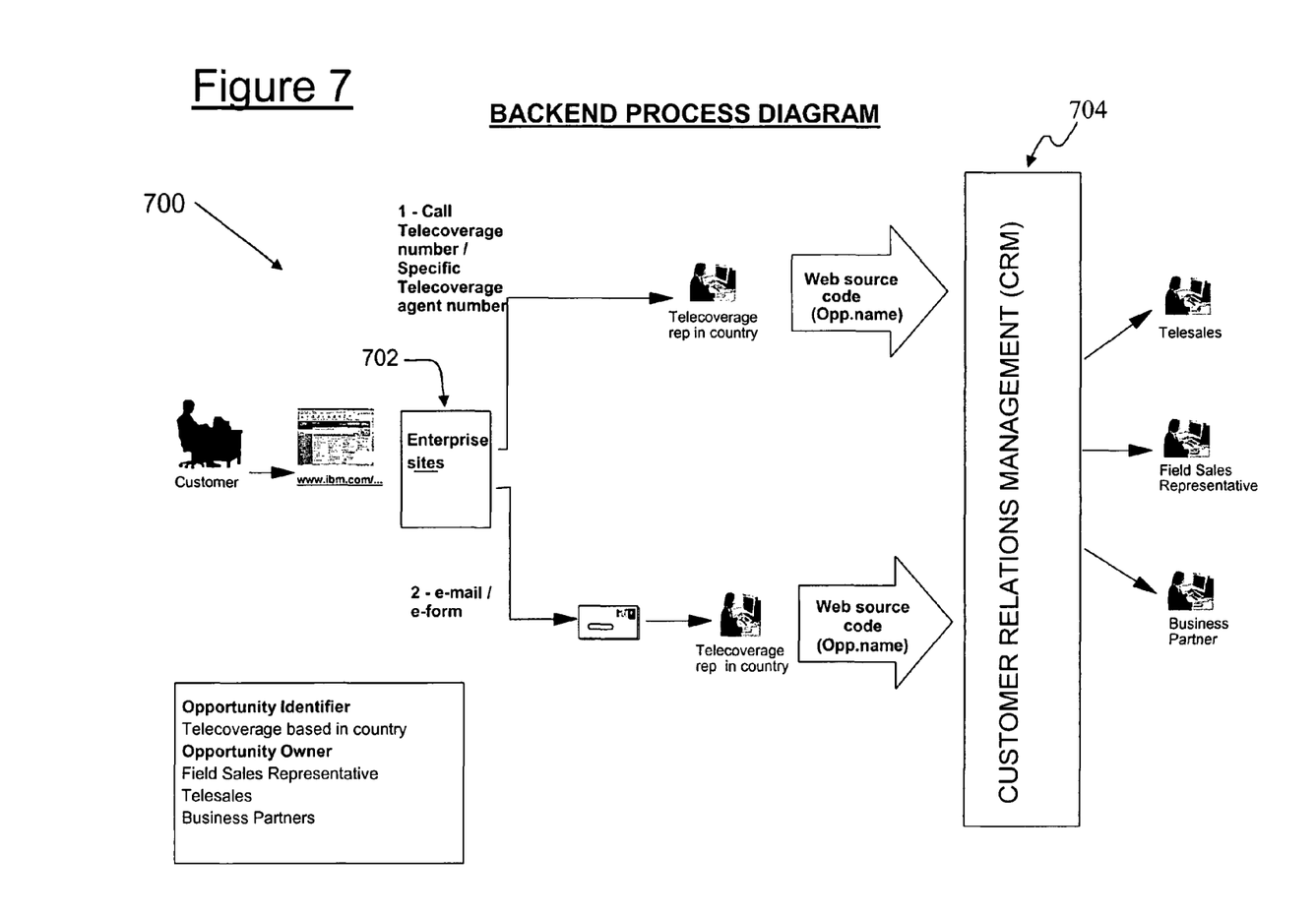
FIG. 7 illustrates a backend process for tracking customer calls.

With reference now to FIG. 7, an exemplary APM Synchronization with Back-end Processes 700 is illustrated. The call from the customer is shown as an access to an enterprise's website 702, such as www.ibm.com. Alternatively, the call could be a telephone call going to a service center, as described above. Either way (website access or telephone call), the call is identified by a particular identifier ("Opp.name"), which is stored as a record in a Customer Relationship Management (CRM) system 704, which is a process/database used to track customer contact. The call identifier ("Opp.name") will identify the customer's name, the country from which the customer is calling or in which the customer needs a service/product, the telecoverage team in a particular country, et al. This call identifier is then tracked until a final solution (sale concluded, follow-up planned, sale request cancelled, etc.) is reached.

Management System

The Management System maintains an ongoing review utilizing a consistent quality control approach to drive process improvement and to prioritize development activities. The Management System addresses effectiveness, customer value and experience, and monitors compliance to identify and address issues. For example, the Management System may include reviewing Access Points Inventory 200 shown above in FIG. 2, to determine that one or more country activities should be consolidated due to having common team leaders, etc.

Preferably, the Management System is directed by an APM leader. APM focal points in each service and/or telecoverage team center will review daily the activities of the APM. Weekly APM conference calls are held with at each center with the APM leader, and biweekly Region Project Leaders (RPLs) call web teams and process teams to review APM activities. The entire APM process is reviewed/revised at least annually.

The present invention is especially useful in a European environment, in which multiple European countries are serviced by different sales and service centers. However, the described process is also useful when coordinating and directing any call to a large enterprise. The APM thus supports the simplification of the customer contact experience. This simplification is accomplished through the streamlined integration of customer contact mechanisms and the clear definition of roles, responsibilities and relationships between internal enterprise organizations, thus reducing call transfers and increasing customer satisfaction. The APM identifies all access points of entry for the customer, both web and non-web, and provides a defined roadmap to the appropriate resource with the skills required to resolve the customer's request within the defined timeframe. Access points include voice calls, web, text chat, call me buttons, etc. The APM handles customer inquiries by listing an inventory of access points for the enterprise, providing a list of responsible people for each particular project, program or initiative, and generating a model diagram (such as shown in FIG. 4 and available to every agent in both the service center as well as the telecoverage team) illustrating the most optimized path a customer request should follow to reach a resource person to solve the need of an inquiry.

The APM furnishes the listing inventory of access points, the list of responsible people, the model diagram, and the narrative description to multiple agents at a contact center, and establishes and obtains agreements from the multiple agents to follow a standard rule of engagement for handling incoming customer calls to an enterprise. The APM also performs a synchronization to reconcile every customer request to a final status conclusion, and performs a management ongoing review of the synchronization to drive process improvement and to prioritize development activities.

Note that while the present invention may be incorporated into a third party service for any client enterprise. That is, the invention may implemented by a third party service provider to provide to a client enterprise the herein described streamlined process for handling customer calls to that client enterprise. Thus, the third party service provider may create and/or maintain some or all of the APM, as described by the present invention, such that the APM is customized for the client enterprise by the third party service provider.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method comprising:
   in response to receiving a customer request via at least one of a plurality of different access points in an enterprise:
      creating, using a Customer Relationship Management (CRM) system, an access point inventory including access point inventory data of one or more access points; wherein the CRM system is stored in a computer readable data storage system;
      providing a list, wherein the list is stored in the computer readable data storage system, wherein the list identifies one or more people responsible for one or more projects, programs or initiatives, wherein among the one or more people is a telecoverage representative assigned to one or more geographic regions;
      a processor generating a model diagram illustrating an optimized path including one or more process steps that a customer request follows to reach a resource person to solve the customer request, wherein the optimized path is a preferred sequence of the one or more process steps, and wherein the one or more process steps include one or more of a web associated interface and a non-web associated interface to reach an appropriate resource to solve the customer request within a documented timeframe;
      providing a narrative description, stored in the computer readable data storage system, of each of the one or more process steps in the generated model diagram; wherein the narrative description includes instruction level detail to perform each of the one or more process steps in the optimized path;
      outputting, using the CRM system, each of the access point inventory, the list, the model diagram, and the narrative description to one or more agents at a contact center;
      in response to determining that a third party service provider is associated with the customer request, outputting to the one or more agents at the contact center, using the CRM system, a third party inventory and a list of one or more people associated with the third party, wherein the third party inventory includes one or more third party access points associated with the third party service provider; and
      performing a synchronization, using the CRM system, to reconcile the customer request to a final status conclusion.

2. The computer-implemented method of claim 1, further comprising directing a call from the customer to the telecoverage representative.

3. The computer-implemented method of claim 1, wherein the telecoverage representative is an agent in a telecoverage team assigned to service a specific geographic region.

4. The computer-implemented method of claim 3, wherein the specific geographic region is a country.

5. The computer-implemented method of claim 1, wherein the telecoverage representative is an agent in a telecoverage team assigned to service a particular group of customers.

6. The computer-implemented method of claim 1, wherein the access point inventory identifies and documents all existing customer entry points for one or more communication from among voice, e-mail, text chat, call me back buttons, fax, postal mail, and other communications, and wherein the access point inventory identifies streamlining and improvement opportunities targeting a reduced number of entry points, and wherein each access point has a predetermined service level target which can be monitored and measured.

7. A computer-implemented service comprising:
   in response to receiving a customer request via at least one of a plurality of different access points in an enterprise:
      creating, using a Customer Relationship Management (CRM) system, an access point inventory including access point inventory data of one or more access points; wherein the CRM system is stored in a computer readable data storage system;
      providing a list, wherein the list is stored in the computer readable data storage system, wherein the list identifies one or more people responsible for one or more projects, programs or initiatives, wherein among the one or more people is a telecoverage representative assigned to one or more geographic regions;
      a processor generating a model diagram illustrating an optimized path including one or more process steps that a customer request follows to reach a resource person to solve the customer request, wherein the optimized path is a preferred sequence of the one or more process steps, and wherein the one or more process steps include one or more of a web associated interface and a non-web associated interface to reach an appropriate resource to solve the customer request within a documented timeframe;

providing a narrative description, stored in the computer readable data storage system, of each of the one or more process steps in the generated model diagram; wherein the narrative description includes instruction level detail to perform each of the one or more process steps in the optimized path;

outputting, using the CRM system, each of the access point inventory, the list, the model diagram, and the narrative description to one or more agents at a contact center;

in response to determining a third party service provider is associated with the customer request, outputting to the one or more agents at the contact center, using the CRM system, a third party inventory and a list of one or more people associated with the third party, wherein the third party inventory includes one or more third party access points associated with the third party service provider; and performing a synchronization, using the CRM system, to reconcile the customer request to a final status conclusion.

8. The computer-implemented service of claim 7, wherein the one or more people and the multiple agents are employees of the third party service provider.

9. The computer-implemented service of claim 7, wherein the one or more people and the multiple agents are employees of the enterprise.

10. The computer-implemented service of claim 7, further comprising directing a call from the customer to the telecoverage representative.

11. The computer-implemented service of claim 7, wherein the telecoverage representative is an agent in a telecoverage team assigned to service a specific geographic region.

12. The computer-implemented service of claim 11, wherein the specific geographic region is a country.

13. The computer-implemented service of claim 7, wherein the telecoverage representative is an agent in a telecoverage team assigned to service a particular group of customers.

14. The computer-implemented service of claim 7, wherein the telecoverage representative is an employee of the third party service provider.

15. The computer-implemented service of claim 7, wherein the telecoverage representative is an employee of the enterprise.

16. A computer program product comprising a computer usable storage medium having program code residing thereon that, when executed on a computing device, in response to receiving a customer request via at least one of a plurality of different access points in an enterprise, causes the device to perform the functions of:

creating, using a Customer Relationship Management (CRM) system, an access point inventory including access point inventory data of one or more access points; wherein the CRM system is stored in a computer readable data storage system;

providing a list, wherein the list is stored in the computer readable data storage system, wherein the list identifies one or more people responsible for one or more projects, programs or initiatives, wherein among the one or more people is a telecoverage representative assigned to one or more geographic regions;

a processor generating a model diagram illustrating an optimized path including one or more process steps that a customer request follows to reach a resource person to solve the customer request, wherein the optimized path is a preferred sequence of the one or more process steps, and wherein the one or more process steps include one or more of a web associated interface and a non-web associated interface to reach an appropriate resource to solve the customer request within a documented timeframe;

providing a narrative description, stored in the computer readable data storage system, of each of the one or more process steps in the generated model diagram; wherein the narrative description includes instruction level detail to perform each of the one or more process steps in the optimized path;

outputting, using the CRM system, each of the access point inventory, the list, the model diagram, and the narrative description to one or more agents at a contact center;

in response to determining a third party service provider is associated with the customer request, outputting to the one or more agents at the contact center, using the CRM system, a third party inventory and a list of one or more people associated with the third party, wherein the third party inventory includes one or more third party access points associated with the third party service provider; and performing a synchronization, using the CRM system, to reconcile the customer request to a final status conclusion.

17. The computer program product of claim 16, further comprising program code for directing a call from the customer to the telecoverage representative.

18. The computer program product of claim 16, wherein the telecoverage representative is an agent in a telecoverage team assigned to service a specific geographic region.

19. The computer program product of claim 18, wherein the specific geographic region is a country.

20. The computer program product of claim 16, wherein the telecoverage representative is an agent in a telecoverage team assigned to service a particular group of customers.

* * * * *